Nov. 20, 1945. A. W. LANE ET AL 2,389,158
CONTROLLER FOR GYRO INSTRUMENTS
Filed July 18, 1942 2 Sheets-Sheet 1

INVENTORS:
A. W. LANE
R. S. CURRY, JR.
BY Herbert H. Thompson
their ATTORNEY.

Nov. 20, 1945.  A. W. LANE ET AL  2,389,158
CONTROLLER FOR GYRO INSTRUMENTS
Filed July 18, 1942  2 Sheets-Sheet 2
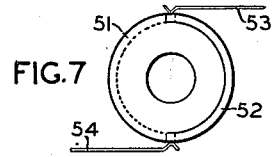
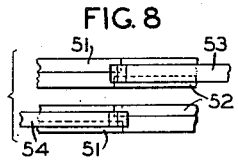 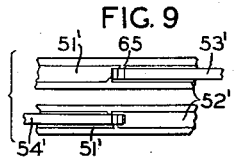 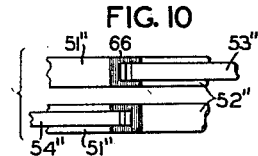
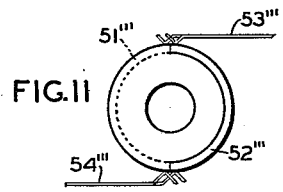
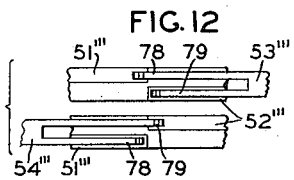 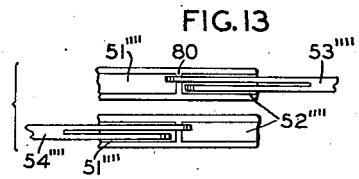
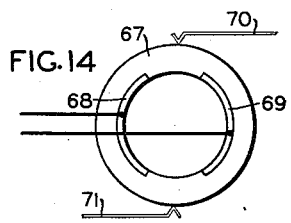 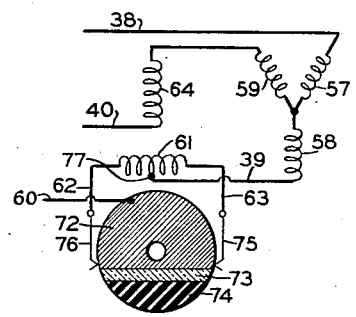
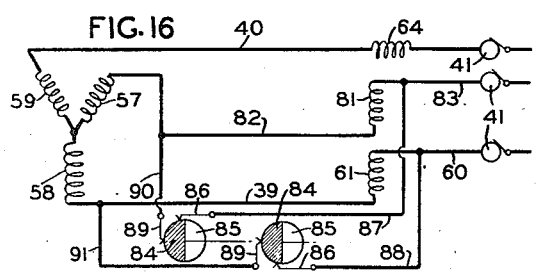
INVENTORS:
A. W. LANE
R. S. CURRY, JR.
BY Herbert H. Thompson
their ATTORNEY.

Patented Nov. 20, 1945

2,389,158

UNITED STATES PATENT OFFICE 2,389,158

CONTROLLER FOR GYRO INSTRUMENTS

Arthur W. Lane, Freeport, and Robert S. Curry, Jr., Baldwin, N. Y., assignors to Sperry Gyroscope Company, Inc., Brooklyn, N. Y., a corporation of New York Application July 18, 1942, Serial No. 451,442

14 Claims. (Cl. 74—5)

This invention relates to gyroscopic instruments and particularly concerns a controller for a circuit therefor by which electrical energy is supplied to both spin the rotor of the instrument and render effective an electrically responsive torque exerting means for the same.

An object of the invention is to provide an instrument of this character having an electrically driven rotor and a similarly operated torque exerting means which are included in a single circuit and energized by a single source of energy.

One of the features of the invention resides in the utilization of a controller of the commutator and brush type in the circuit arrangement of the gyro instrument.

Another feature of the invention is contained in the provision of a controller of this character which also is constructed in the form of an electrical resistor that operates to decrease the resistance in the circuit when the torque exerting means is included therein as the angle of tilt of the rotor bearing case increases. This effectively controls the rate at which the rotor bearing case is precessed by the torque exerting means of the gyro instrument in returning to a normal position.

A further feature of the invention resides in the provision of a two segment commutator and a double brush type of controller in which the respective brushes are normally positioned to connect the segments of the commutator and thereby short the torque exerting means of the gyro instrument.

Other objects, features and structural details of the invention will be apparent from the following description when read in connection with the accompanying drawings, wherein Fig. 1 is a side elevation view illustrating a controller constructed in accordance with the invention employed for use in connection with a directional gyro instrument of conventional form, the casing for such instrument being shown in section.

Fig. 7 is an enlarged view similar to Fig. 3.

Figs. 8, 9, and 10 are schematic views showing three different types of commutator constructions usable with the brushes illustrated in Fig. 7.

Fig. 11 is a view similar to Fig. 7 showing a modified type of brush structure in a controller constructed in accordance with the present invention.

Figs. 12 and 13 are schematic views similar to Figs. 8, 9 and 10, in which two types of commutator constructions usable with the brushes illustrated in Fig. 11 are shown.

Fig. 14 is an enlarged view similar to Figs. 7 and 11 in which a further modification of the controller is illustrated.

Figures 5, 6:
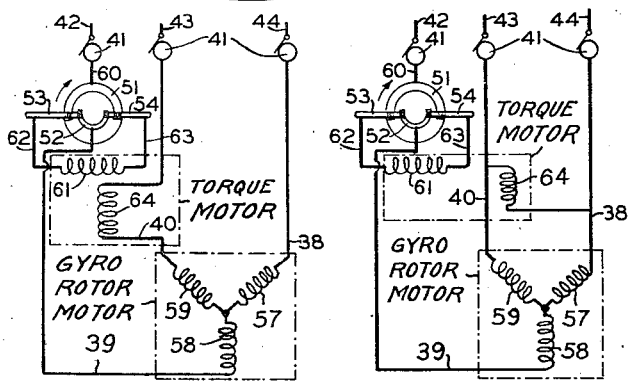
Figs. 5 and 6 are schematic wiring diagrams showing different methods of arrangement of the controller in the electrical circuit of the gyroscopic instrument.

Fig. 15 is a schematic wiring diagram similar to Figs. 5 and 6 in which a modified controller and method of controlling the circuit of the gyroscopic instrument is shown, and Fig. 16 is a view similar to Fig. 15 of a still further modification of the invention.

Figure 1:
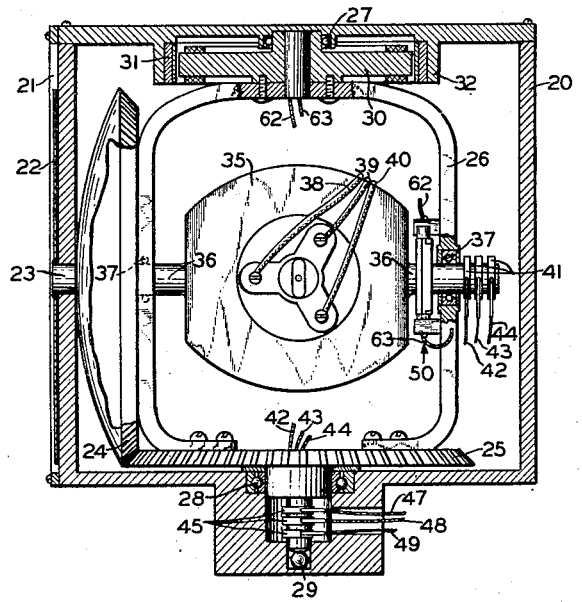
Figure 2:
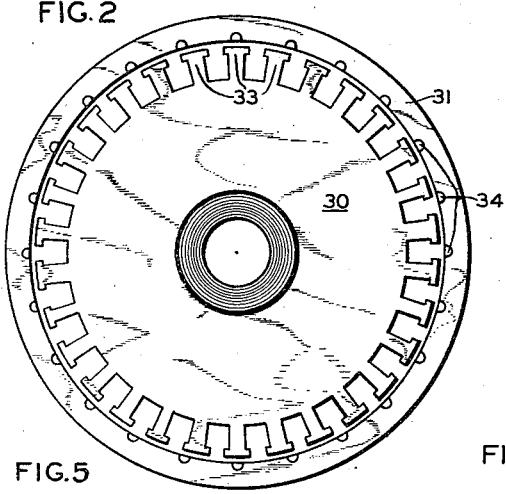
Fig. 2 is an enlarged plan view of the torque exerting means utilized in the directional gyro instrument shown in Fig. 1.

With particular reference to Fig. 1, a conventional gyro instrument of the direction indicating type is illustratively employed in showing a practical usage for the improved controller which is incorporated in the same. Such an instrument, as shown, includes an outer casing 20, the front of which is provided with a window 21 through which the observer sees a conventional compass card 22. The usual compass indications are contained on the surface of the card which is read by comparison of the same with a lubber line (not shown) situated on the window 21 in a conventional manner. Compass card 22 is fixed to a shaft 23 which in turn is rotated by the meshing bevel gears 24 and 25 which are controlled by the conventional vertical ring 26 of the gyro instrument. In the instance shown, ring 26 is fixed to the top of the bevel gear 25 and is confined to movement within the casing 20 by means of the upper bearing 27 and lower bearing 28 so that the same rotates about a normally vertical axis. Thrust bearing 29 is provided to carry the weight of the ring and the parts mounted thereon. As shown in the drawings, an electrically responsive torque exerting means in the form of a motor is utilized with the vertical ring 26. Such a motor which is generally of the squirrel cage induction type includes a stator 30 mounted in fixed relation to the ring 26 and a rotor 31 in the form of an annular ring which is mounted within the outer casing 20 by means of a suitable holding flange 32. The stator 30 is provided with radially extending pole pieces 33 about its periphery and may be two or three phase wound as hereinafter more particularly described. The rotor 31 of the motor carries no windings being constructed to include a number of circumferentially spaced, vertically extending, interconnected, squirrel cage type inductor elements 34. The stator 30 is coaxially arranged on the ring and when the motor is rendered effective induces a precessional moment about the axis of the vertical ring causing precession of the rotor bearing case.

The gyro instrument of the character shown also has a conventional rotor bearing case or frame, as indicated at 35, which is mounted for movement about a horizontal axis between the vertical arms of the ring 26 by means of trunnion and bearing connections as respectfully designated at 36 and 37. The gyro rotor (not shown) is contained within the rotor bearing case 35, the same being mounted in conventional fashion to spin about a normally horizontal axis perpendicular to the plane of the paper as viewed in Fig. 1. In the normal position of the rotor bearing case 35, the spin axis of the gyro rotor is perpendicularly arranged with respect to both the axis of the case and the axis of the ring 26. Ring 26 consequently provides the usual universal mounting for the rotor bearing case of the directional gyro instrument. The motor or torque exerting means illustrated is effective, as well understood in the art, to exert a corrective torque about the axis of the vertical ring which results in movement of the rotor bearing case 35 about its axis in a direction that restores the case from a tilted to a normal position.

Figure 3:
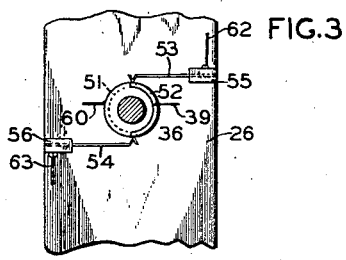
Fig. 3 is a detail plan view of the type of controller illustrated in Fig. 1.
Figure 4:
Fig. 4 is an enlarged perspective view of the commutator part of the type of controller shown in Fig. 3.

The gyro rotor in the present instance is electrically spun by a suitable motor (not shown) of conventional form which is contained within the rotor bearing case. Preferably such a motor is three phase wound and is supplied with electrical energy from a suitable source by way of three leads 38, 39 and 40, slip rings 41, leads 42, 43 and 44, slip rings 45 and further leads 47, 48 and 49 which are directly connected to the source of alternating current energy. The controller for the instrument has two parts which are mounted for movement relative to one another about the axis of the rotor bearing case 35. In the form of controller shown in Figs. 1, 3, 4 and 9, these parts generally are of the cooperative commutator and brush type and are arranged with the commutator as the movable element and the brush part as the relatively fixed element. A commutator constructed as shown in detail in Fig. 4 is rigidly fixed to one of the trunnions 36 of the rotor bearing case 35, the same being concentrically arranged in relation to the axis of the case. The controller is generally indicated in Fig. 1 by the reference number 50. With reference to Fig. 4, the commutator is shown to include two oppositely disposed conducting segments 51 and 52 which are axially spaced. These segments which are of equal length are arranged in the body of the commutator so that their respective ends overlap. As shown in Fig. 3, the two brushes 53 and 54 which cooperate with the commutator are suitably fixed at one end of the same to the inwardly disposed face of the vertical ring 26 by means of clamping pieces 55 and 56 respectively. The brushes are oppositely disposed and the commutator contacting ends of the same are of sufficient width to contact both of the conducting segments 51 and 52 as clearly shown in Fig. 8. When the rotor bearing case is normally positioned, the parts of the controller are positioned as shown in Fig. 3 in which the upper brush 53 rests on the overlapping portions of the segments 51 and 52 and hence connects the same electrically. Lower brush 54 is similarly located across the overlapping segment ends at the bottom of the commutator as viewed in Figs. 3 and 8. The relative arrangement of the parts when so positioned is depicted diagrammatically in Figs. 5 and 6. In the wiring diagram also shown in these views, the windings of the three phase motor for driving the gyro rotor are indicated at 57, 58, and 59. The controller is included in the circuit, for example, in the energy supplying lead 42 for the gyro rotor spinning motor, a lead 60 being provided to connect slip ring 41 and the conducting commutator segment 51. Segment 52 of the commutator is connected to winding 58 of the motor by way of lead 39.

In this form of the invention, the torque exerting means is constructed in the form of a two phase wound torque motor, one of whose windings as indicated at 61 is connected to the respective brushes of the commutator by way of leads 62 and 63. The other winding 64 as shown in Fig. 5 is placed in series relation in the lead 40 by which energy is supplied to the rotor spinning motor winding 59. An alternative manner of arranging the continuously energized winding 64 of the two phase torque motor is shown in Fig. 6, in which the same is arranged in parallel electrical relation to the respective windings 59 and 57 of the rotor spinning motor. The brush circuit of the controller which includes the torque exerting means may be termed a second circuit which is normally short circuited by the arrangement of the cooperating commutator parts. The controller is consequently operative to render the torque exerting means ineffective when the rotor bearing case of the illustrated directional gyro instrument is normally positioned, the energy moving through the controller by way of lead 60, segment 51, the segment connecting brushes 53—54, segment 52 and lead 39 to the rotor spinning motor. In the operation of the instrument, if, for example, the rotor bearing case and commutator tilt about their common axis or move in the direction of the arrow, as viewed in Figs. 5 and 6, the left hand end of segment 51 clears brush 53 and the right hand end of segment 52 clears brush 54. The torque motor is then selectively included in the energy supplying circuit, the winding 61 of the same being energized by passage of the energy through lead 60, segment 51, brush 54, lead 63, winding 61, lead 62, brush 53, segment 52 and lead 39 to the motor spinning the gyro rotor. In this instance, the second circuit which includes the winding 61 of the torque motor is selectively arranged by the controller in series relation in the energy supplying circuit for the gyro instrument. In the event that tilt of the rotor bearing case occurs in the opposite direction to that indicated by the arrow in Figs. 5 and 6, a similar circuit is completed with the energy passing through the winding 61 of the torque motor in the opposite direction. The direction of rotation of the torque motor is consequently controlled so that the same is effective to restore the rotor bearing case to a normal position as well understood in the art.

In Fig. 9, a modification of the controller is shown in which the segments of the commutator are not axially displaced. In this construction, the spaced ends of the respective segments 51' and 52' are skewed as indicated at 65 and the brushes 53' and 54' normally contact this portion of the commutator.

With reference to Fig. 10, the oppositely disposed portions of the commutator segments 51'' and 52'' are shown connected by a resistance element 66. The brushes 53'' and 54'' are of equal length and in form are similar to those illustrated in Figs. 7, 8 and 9 and heretofore described in detail. The brushes normally contact the center of the coiled resistor 66 which operates to decrease the resistance in the energy supplying circuit for the gyro instrument when the torque exerting means is included therein as the angle of tilt of the rotor bearing case increases. Consequently, the effectiveness of the torque motor is made approximately proportional to the angular deviation of the rotor bearing case from its normal position. A further type of controller adapted to fulfill this purpose is shown in detail in Fig. 14 in which the commutator is constructed in the form of a ring 67 made of a suitable semi-conducting material which includes therein two oppositely disposed segments 68 and 69 made of conducting material. The brushes 70 and 71 for this type of controller normally contact the periphery of the ring type commutator midway between the respective conducting segments. A further adaptation of this type of controller with a two phase type torque motor is illustrated in Fig. 15 in which the torque motor is situated in bridged relation to the controller. In this instance, the controller is provided by a ring type commutator having a conducting segment 72, a semi-conducting or resistor segment 73 and a non-conducting segment 74. The brushes are indicated at 75 and 76, being arranged to normally contact the conducting segment of the commutator. The winding 61 of the torque motor is bridged across the controller by a center tap connection 77 thereto of lead 39. In this event, energy normally passes through both branches of the winding 61 to an equal extent in moving to the motor for the gyro rotor. As the commutator moves with inclination of the rotor bearing case, one or the other of the branches of the bridged winding 61 becomes effective to operate the torque motor and restore the rotor bearing case to a normal position.

With reference to Figs. 11, 12 and 13, a number of further modifications of the form of controller shown in Figs. 8 and 9 are shown. The axially displaced segment type of controller illustrated in Fig. 8, is changed as shown in Figs. 11 and 12 so that the ends of the segments do not overlap. The oppositely disposed segments 51''' and 52''' are of equal length in this arrangement and the respective brushes 53''' and 54''' are constructed to include dual arms 78 and 79 of different length. The same arrangement of controller parts is shown in Figs. 11 and 13 except for the fact that the oppositely disposed segments 51'''' and 52'''' are not axially disposed but are arranged in coaxial relation with an insulating space 80 therebetween. The brushes 53'''' and 54'''' are constructed in the same fashion as the type illustrated in Fig. 12.

An alternative form of circuit arrangement and commutator and brush type controller therefor is shown in Fig. 16 in which the torque motor is three phase wound. This additional winding is indicated at 81, the same being connected to motor winding 57 by way of lead 82. In the electrical arrangement shown in this figure, the respective windings 61, 81 and 64 of the torque motor are in series with the respective windings 58, 57 and 59 of the motor by which the gyro rotor is spun. Two of the leads through which energy is supplied the gyro instrument as indicated at 60 and 83 are controlled by a commutator and brush type controller that in this instance performs the function of two normally closed switches which normally render the torque motor ineffective. Each switch includes a conducting segment 84 and a non-conducting segment 85. The respective brushes 86 in the arrangement shown normally contact the conducting segments 84 and connect with leads 83 and 60 by way of the short-circuiting leads 87 and 88 respectively. The other brushes 89 are connected to motor windings 57 and 58 by the respective leads 90 and 91. When the commutator moves so that either one of the brushes 86 is brought into contact with a non-conducting segment 85, one of the windings 81 or 61 is energized without influencing the operation of the motor for the gyro rotor and the torque motor is then effective to restore the rotor bearing case to a normal position.

The system is equally effective if the controller performs the function of two normally open switches in which event the brushes 86 normally contact the non-conducting segments 85 of the controller. Then, in operation of the system, either one of the motor windings 81 or 61 are selectively short-circuited by the controller to render the motor effective to restore the rotor bearing case to a normal position.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A controller for a circuit by which electrical energy is supplied to both spin the rotor of a gyroscopic instrument and render effective an electrically responsive torque exerting means for the same comprising a relatively movable commutator having two oppositely disposed segments and a cooperative pair of brushes positioned to normally connect the segments electrically, energy being supplied by way of said commutator segments to continuously spin the rotor and by way of said brushes to differentially control the torque exerting means.

2. A controller of the character claimed in claim 1, in which the segments of the commutator are axially spaced and are constructed of equal length with the respective ends of the same overlapping.

3. A controller of the character claimed in claim 1, in which the segments of the commutator have spaced skewed ends.

4. A controller of the character claimed in claim 1, in which the segments of the commutator have spaced ends which are connected by a resistance element.

5. In an electrical gyro instrument having a rotor, a motor for spinning the rotor, a rotor bearing frame, a gimbal ring by which said frame is universally mounted, electrical torque exerting means effective about one of the axes of mounting of the frame; and means for energizing said torque exerting means including a first circuit having leads on said ring and frame by which energy is supplied to the rotor spinning motor, a continuously conducting controller included in said first circuit having intake and outlet parts mounted for movement relative to one another about the other of the axes of the frame, a second circuit having leads connected to said controller by which the torque exerting means is controlled, the parts of said controller cooperating to normally short said second circuit and to selectively connect said first and second circuits when the frame tilts about its other axis.

6. An instrument as claimed in claim 5, in which the first and second circuits are connected in series relation by said controller.

7. An instrument as claimed in claim 5, in which said controller is a variable resistor that decreases the resistance in the connected first and second circuits as the angle of tilt of the frame increases.

8. An electrical gyro instrument as claimed in claim 5, in which the parts of the controller are a commutator having two oppositely disposed segments and a cooperative pair of brushes positioned to normally connect the segments electrically.

9. An electrical gyro instrument as claimed in claim 5, in which the parts of the controller are a commutator having two, axially spaced, oppositely disposed segments of equal length with overlapping ends and two oppositely disposed brushes positioned to normally connect the respective overlapping ends of the segments.

10. An electrical gyro instrument as claimed in claim 5, in which the parts of the controller are a commutator having two oppositely disposed segments of equal length whose spaced ends are skewed and two oppositely disposed brushes positioned to normally connect the respective skewed ends of the segments.

11. An electrical gyro instrument as claimed in claim 5, in which the parts of the controller are a commutator having two oppositely disposed segments of equal length whose spaced ends are connected by a resistance element and two oppositely disposed brushes positioned to normally contact the respective resistance elements at the center thereof.

12. In an electrical gyro instrument having a rotor, a motor for spinning the rotor, a rotor bearing frame, a gimbal ring by which said frame is universally mounted, a polyphase motor for exerting a torque about one of the axes of mounting of the frame; and means for energizing said torque motor including a first circuit having leads on said ring and frame by which energy is supplied to the rotor spinning motor and to one winding of the torque motor, a continuously conducting controller included in said first circuit movable with movement of the frame about its other axis, a second circuit having leads connected to said controller and including the other of the windings of the torque motor, said controller normally operating to short said second circuit and operating upon tilt of the frame about its other axis to selectively connect said first and second circuits.

13. In an electric directional gyro, a vertical ring, a rotor bearing frame mounted for movement about a horizontal axis on said ring, a rotor, a motor for spinning said rotor, electrical means effective to exert a torque about the axis of the ring; and means for energizing said torque exerting means including a first circuit having leads on said ring and frame by which energy is supplied to the rotor spinning motor, a continuously conducting controller included in said first circuit having relatively movable intake and outlet parts, one of which is fixed to the ring, a second circuit having leads connected to said controller by which the torque exerting means is controlled, the parts of said controller cooperating to normally short said second circuit and to selectively connect said first and second circuits when the frame tilts about its horizontal axis.

14. In an electric directional gyro, a vertical ring, a rotor bearing frame mounted for movement about a horizontal axis on said ring, a rotor, a motor for spinning said rotor, a polyphase motor for exerting a torque about the axis of the ring; and means for energizing said torque motor including a first circuit having leads on said ring and frame by which energy is supplied to the rotor spinning motor and to one winding of the torque motor, a continuously conducting controller included in said circuit movable with tilt of the frame about its horizontal axis, a second circuit having leads connected to said controller and including the other of the windings of the torque motor, said controller normally operating to short said second circuit and operating upon tilt of the frame about its horizontal axis to selectively connect said first and second circuits.

ARTHUR W. LANE.
ROBERT S. CURRY, Jr.